United States Patent [19]
Urban et al.

[11] Patent Number: 5,704,440
[45] Date of Patent: Jan. 6, 1998

[54] ENERGY DISTRIBUTION METHOD FOR HYBRID ELECTRIC VEHICLE

[75] Inventors: Edward F. Urban, Glen Head; George E. Mavroudis, Dix Hills; Brian Peskin, West Hempstead, all of N.Y.

[73] Assignee: New York Institute of Technology, Old Westbury, N.Y.

[21] Appl. No.: 455,840

[22] Filed: May 31, 1995

[51] Int. Cl.⁶ ..................................................... B60K 1/00
[52] U.S. Cl. ....................... 180/65.2; 180/65.3; 180/65.7
[58] Field of Search .............................. 180/65.2, 65.3, 180/65.7, 65.8, 65.6, 343, 344; 74/847, 848, 866

[56] References Cited

U.S. PATENT DOCUMENTS

| | | |
|---|---|---|
| 2,506,809 | 5/1950 | Nims . |
| 2,571,284 | 10/1951 | Nims . |
| 2,666,492 | 1/1954 | Nims et al. . |
| 3,205,965 | 9/1965 | Roth . |
| 3,503,464 | 3/1970 | Yardney . |
| 3,732,751 | 5/1973 | Berman et al. . |
| 3,888,325 | 6/1975 | Reinbeck . |
| 3,923,115 | 12/1975 | Helling . |
| 4,042,056 | 8/1977 | Horwinski et al. . |
| 4,165,795 | 8/1979 | Lynch et al. . |
| 4,242,922 | 1/1981 | Baudoin . |
| 4,313,080 | 1/1982 | Park . |
| 4,351,405 | 9/1982 | Fields et al. . |
| 4,423,794 | 1/1984 | Beck . |
| 4,438,342 | 3/1984 | Kenyon . |
| 4,951,769 | 8/1990 | Kawamura ..................... 180/65.4 |
| 5,002,020 | 3/1991 | Kos . |
| 5,125,469 | 6/1992 | Scott . |
| 5,172,784 | 12/1992 | Varela, Jr. . |
| 5,176,213 | 1/1993 | Kawai et al. . |
| 5,249,637 | 10/1993 | Heidl et al. . |
| 5,255,733 | 10/1993 | King . |
| 5,264,764 | 11/1993 | Kuang . |
| 5,285,111 | 2/1994 | Sherman . |
| 5,291,960 | 3/1994 | Brandenburg et al. . |
| 5,301,764 | 4/1994 | Gardner . |
| 5,318,142 | 6/1994 | Bates et al. . |
| 5,327,987 | 7/1994 | Abdelmalek . |
| 5,327,992 | 7/1994 | Boll . |
| 5,337,848 | 8/1994 | Bader . |
| 5,346,031 | 9/1994 | Gardner . |
| 5,359,308 | 10/1994 | Sun et al. . |

FOREIGN PATENT DOCUMENTS

| | | |
|---|---|---|
| 0136055 | 4/1985 | European Pat. Off. . |
| 0510582 | 10/1992 | European Pat. Off. . |
| 0648635 | 4/1995 | European Pat. Off. . |
| 93/23263 | 11/1993 | WIPO . |

*Primary Examiner*—Brian L. Johnson
*Assistant Examiner*—Jonathon E. Butts
*Attorney, Agent, or Firm*—Dilworth & Barrese

[57] ABSTRACT

A method for distributing energy in a vehicle having a hybrid electric drive system that includes an internal combustion engine and at least one electric motor which deliver torque to a primary drive shift having at least two drive wheels operatively associated therewith. The method includes the steps of delivering torque from the internal combustion engine and the electric motor to the primary drive shaft to accelerate the vehicle from a stationary position to a predetermined cruising velocity, disengaging the electric motor from the primary drive shaft once the vehicle has accelerate to the cruising velocity to reduce parasitic drag on the system, and delivering torque from the internal combustion engine to the primary drive shaft utilizing the mean horsepower of the internal combustion engine to maintain the vehicle at the cruising velocity.

18 Claims, 8 Drawing Sheets

ENERGY DISTRIBUTION METHOD FOR HYBRID ELECTRIC VEHICLE

BACKGROUND OF THE INVENTION

1. Field of the Invention

The subject invention relates to a vehicle drive system, and more particularly, to a method of distributing energy in a hybrid electric automobile which employs both a combustion engine and an electric motor to power the vehicle.

2. Description of the Related Art

For nearly a century, automobiles have been powered by internal combustion engines, which by the very nature of their fuel burning process, emit harmful waste products into the environment. Recently, vehicles that are powered solely by electric motors have been introduced in an attempt to minimize the amount of hazardous waste being admitted to the air. Electric vehicles are limited in their range and applicability however, since they possess large storage batteries that must be recharged over an extended period of time.

Automobiles utilizing both an internal combustion engine and an electric motor for power are also known in the art, and are commonly referred to as hybrid powered vehicles. These vehicles are designed to minimize harmful effluents and maximize the beneficial aspects of gas engines and electric motors. Early examples of hybrid electric vehicles are disclosed in U.S. Pat. No. 2,571,284 to P. T. Nims; U.S. Pat. No. 3,305,965 to R. Roth; and U.S. Pat. No. 3,791,473 to Rosen. In general, there are two types of hybrid electric vehicle drive systems. A parallel drive system in which the internal combustion engine and the electric motor work in conjunction to power the drive wheels of the vehicle, and a series drive system wherein the internal combustion engine powers a generator for the electric motor and the electric motor delivers power to the drive wheels of the vehicle.

An example of a hybrid powdered vehicle which employs a modified parallel drive system is disclosed in U.S. Pat. No 4,042,056 to Horwinski. The modified drive system includes an internal combustion engine that delivers power to a front drive shaft of the vehicle and an electric motor that delivers power to a rear drive shaft of the vehicle through an automatic transmission. In operation, the electric motor and the automatic transmission are used to accelerate the vehicle to highway cruising speed. When or shortly before cruising speed is attained, the internal combustion engine is started and a magnetic clutch connects the engine to the front drive shaft. At the same time, the internal combustion engine can be employed to drive a generator that charges the batteries which deliver power to the electric motor.

Another hybrid electric vehicle which employs an internal combustion engine to drive the front wheels of the vehicle and an electric motor to drive the rear wheels of the vehicle, and which provides a mechanism for selecting between the two is disclosed in U.S. Pat. No. 4,351,045 to Fields et al. Other hybrid vehicle drive systems are disclosed in U.S. Pat. No. 3,732,751 to Berman et at.; U.S. Pat. No. 3,888,352 to Reinbeck; U.S Pat. No. 4,423,794 to Beck; and U.S. Pat. No. 4,242,922 to Baudoin.

To date, there has not been a hybrid electric vehicle with a drive system delivering power to one set of drive wheels, that can operate in both a parallel configuration and a series configuration depending upon the driving conditions encountered by the driver. Such a system would promote the optimum utilization and distribution of energy in a hybrid electric vehicle, while maximizing efficiency and minimizing harmful pollutants.

SUMMARY OF THE INVENTION

The subject invention is directed to a method of distributing energy in a vehicle having a hybrid electric drive system that includes an internal combustion engine and at least one electric motor which deliver torque to a primary drive shaft by way of a transmission assembly, the primary drive shaft having at least two drive wheels operatively associated therewith.

The method includes the steps of delivering torque from the internal combustion engine and the electric motor to an input shaft of the transmission assembly to accelerate the vehicle from a stationary position to a predetermined cruising velocity, disengaging the electric motor from the input shaft of the transmission assembly once the vehicle has accelerated to the cruising velocity to reduce parasitic drag on the system, and delivering torque from the internal combustion engine to the input shaft of the transmission assembly utilizing the mean horsepower of the engine to maintain the vehicle at the cruising velocity.

The method further includes the step of maintaining the electric motor in a neutral condition so that it is disengaged from the input shaft of the transmission assembly so as to reduce parasitic drag on the system, and under certain conditions, the step of selectively engaging the electric motor to the input shaft of the transmission assembly either for zero-emissions driving or to assist the internal combustion engine in accelerating the vehicle to cruising velocity.

The method further includes the step of providing a generator for charging a series of batteries that store energy for utilization by the electric motor in powering the vehicle. The subject invention provides several different methods for delivering power to the generator while the vehicle is in operation. For example, the method can include the step of transferring torque from the drive wheels to the generator when the transmission assembly is downshifted during braking, or the step of transmitting power directly from the internal combustion engine to the generator while the electric motor is transmitting power directly to the input shaft of the transmission assembly.

Alternatively, the method can include the step of engaging the internal combustion engine to the generator when the electrical energy stored in the batteries falls below a predetermined minimum level, or the step of transmitting power from the internal combustion engine to the generator and the input shaft of the transmission assembly while maintaining the electric motor in a neutral condition so that it is disengaged from the input shaft of the transmission assembly.

Another preferred embodiment of the subject invention is directed to a method of distributing energy in a vehicle having a hybrid electric drive system including an internal combustion engine and at least one electric motor which are operatively connected to a drive shaft having at least two drive wheels operatively associated therewith, a generator for converting mechanical energy into electrical energy, and batteries for storing the electrical energy. The method includes the steps of providing a first operating mode wherein power is transmitted to the drive shaft from the internal combustion engine and the electric motor, providing a second operating mode wherein power is transmitted to the generator from the internal combustion engine and power is transmitted to the drive shaft from the electric motor, and switching between the first operating mode and the second operating mode under certain predetermined conditions.

Preferably, the step of switching between the first and second operating modes includes switching from the first operating mode to the second operating mode when the batteries are approximately 60% discharged, and/or switching from the second operating mode to the first operating mode when the batteries are approximately 20% discharged.

These and other features of the energy distribution method of the subject invention will become more readily apparent from the following detailed description of the invention taken in conjunction with the drawings.

BRIEF DESCRIPTION OF THE DRAWINGS

So that one skilled in the art to which the subject invention appertains will better understand how to employ the invention, preferred embodiments thereof will be described hereinbelow with reference to the drawings wherein.

DETAILED DESCRIPTION OF THE PREFERRED EMBODIMENTS

Figure 1:
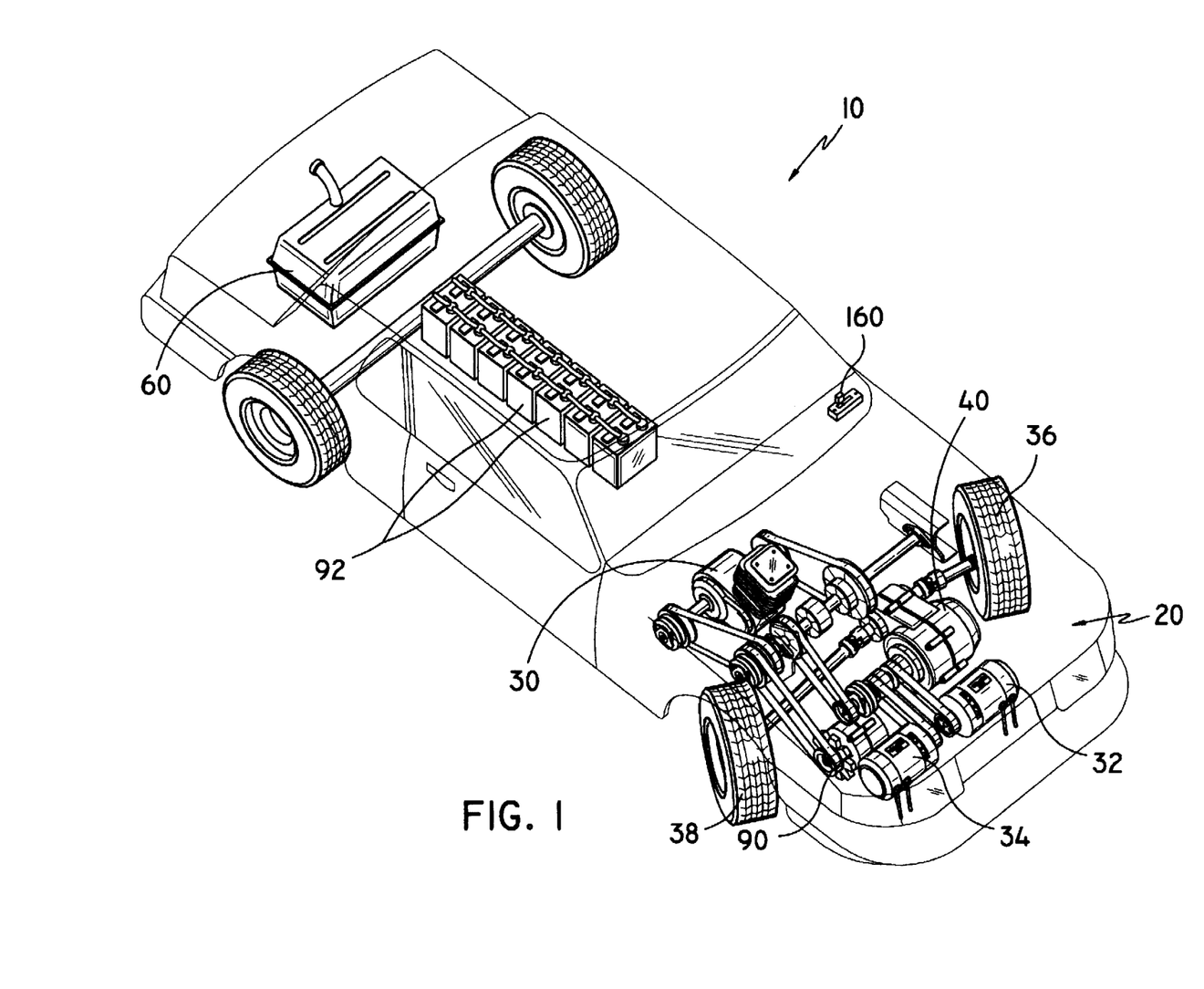
FIG. 1 is a perspective view of a hybrid electric vehicle which includes a vehicle drive system constructed in accordance with a preferred embodiment of the subject invention.

Referring now to the drawings wherein like reference numerals identify similar structural elements of the subject invention, there is illustrated in FIG. 1 a hybrid electric vehicle 10 having a drive system 20 constructed in accordance with a preferred embodiment of the subject invention. In brief, drive system 20 includes a relatively low horsepower internal combustion engine 30 (i.e., 20 hp) and two conventional electric motors 32 and 34 (i.e., 30–60 hp; DC motors) which deliver power to the drive wheels 36 and 38 of vehicle 10, either individually or concurrently, depending upon the operating conditions of the vehicle. The specific power of the engine and the motors will depend upon the size and weight of the vehicle.

Figure 2:
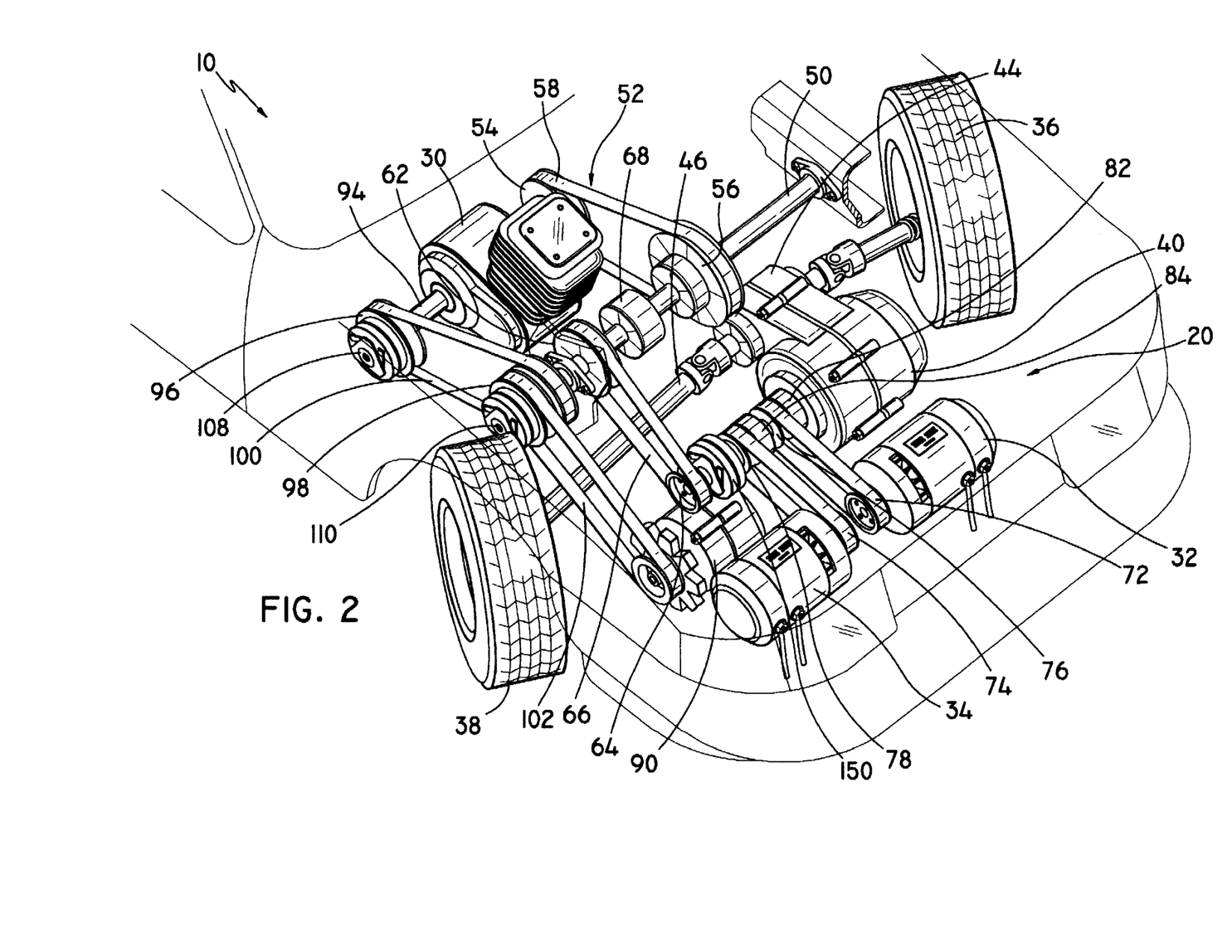
FIG. 2 is an enlarged perspective view of the engine compartment of the hybrid electric vehicle illustrated in FIG. 1 showing each of the components of the vehicle drive system of the subject invention.
Figure 3:
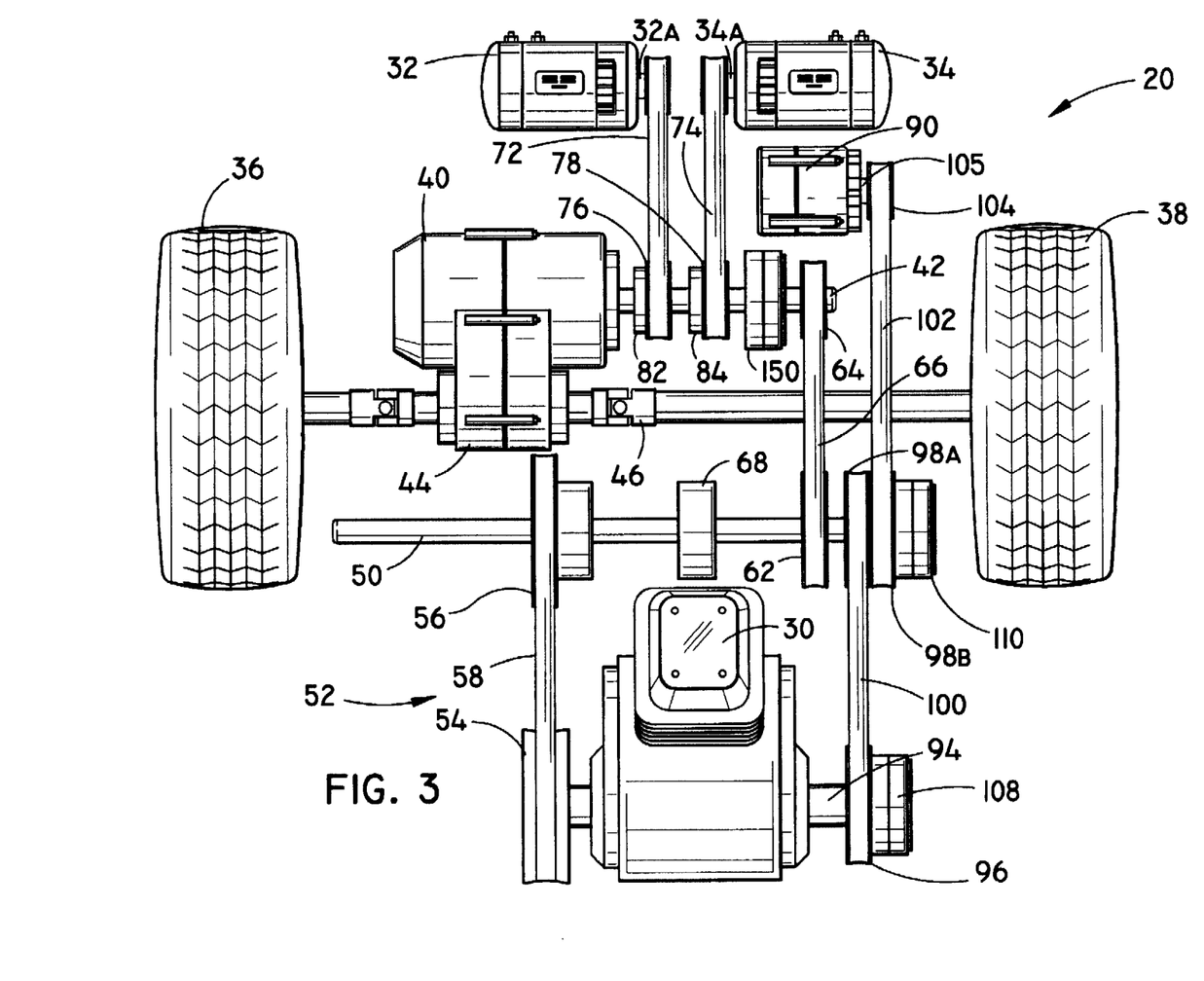
FIG. 3 is top plan view of the vehicle drive system of the subject invention in a steady state condition.

Referring to FIGS. 2 and 3, drive system 20 has a transmission assembly 40 having an input shaft 42 for receiving torque from engine 30 and motors 32 and 34, and a differential gear assembly 44 for transferring torque to the drive wheels 36 and 38 of vehicle 10 through primary drive shaft 46. Transmission assembly 40 is a multispeed manual transmission equipped with a number of forward speeds, neutral, and reverse. Other configurations are envisioned.

Engine 30 transfers torque to the input shaft 42 of transmission assembly 40 by way of a secondary drive shaft 50 mounted adjacent the primary drive shaft 46. More particularly, a pulley-type torque converter assembly 52 is associated with engine 30 for transmitting power to the secondary drive shaft 50. Torque converter assembly 52 includes a drive pulley 54 mounted to an output shaft of engine 30, a variable diameter driven pulley 56 mounted to secondary drive shaft 50, and a belt 68 operatively connecting the two. The torque converter assembly functions as a continuously variable transmission which gradually upshifts as the vehicle accelerates faster allowing the engine to operate at its optimum speeds without placing an undue load thereupon. The torque converter assembly enables vehicle 10 to accelerate from a stationary position to cruising speed using only the small internal combustion engine 30 powered by fuel stored in fuel tank 60 (see FIG. 1). As will be discussed in detail hereinbelow, at times when the engine is used solely to accelerate the vehicle to cruising speed, the electric motors 32 and 34 can be used for rapid acceleration or hill climbing.

With continued reference to FIGS. 2 and 3, a drive pulley 62 is mounted on secondary drive shaft 50 for transferring torque from drive shaft 50 to a second pulley 64 mounted at the end of the input shaft 42 of transmission assembly 40 by way of a belt 66. An overrunning clutch 68 is also mounted on the secondary drive shaft 50 between pulley 56 of torque converter 52 and drive pulley 62, for disengaging engine 30 from the input shaft 42 of transmission assembly 40. Overrunning clutches are well known in the art and employ the wedging action of a roller or sprag to automatically engage in one direction and flee-wheel in the other direction. Thus, when clutch 68 is disengaged, engine 30 is isolated from the rest of the drive system, thereby reducing any parasitic drag on the system.

With continuing reference to FIGS. 2 and 3, the output shafts 32a and 34a of motors 32 and 34 are connected to the input shaft 42 of transmission assembly 40 by way of belts 72 and 74, respectively. More particularly, belts 72 and 74 deliver torque to respective pulleys 76 and 78 which are mounted side-by-side on the input shaft 42 of transmission assembly 40. Overrunning clutches 82 and 84 are operatively associated with pulleys 76 and 78, respectively, to engage input shaft 42 any time the pulleys 76 and 78 turn faster than input shaft 42. For example, when the vehicle is accelerating to cruising velocity under the power of engine 30 and the driver requires additional power to climb hills or quickly accelerate, the electric motors can be triggered by the driver to assist the gas engine in accelerating the vehicle for that period of time. The manner in which this is accomplished will be discussed in greater detail hereinbelow.

The drive system of the subject invention also includes a generator 90 (i.e., 15–22 kW) for generating electrical energy to power electric motors 32 and 34. Generator 90 is linked to a series of conventional lead-acid batteries 92 arranged along the central axis of the vehicle chassis, as shown in FIG. 1. Generator 90 is operatively connected to an output shaft 94 of engine 30 through a set of pulleys and clutches. In particular, a drive pulley 96 is mounted to an output shaft 94 for driving an intermediary double rim pulley 98 which is mounted on the secondary drive shaft 60. A first drive belt 100 extends from drive pulley 96 to the inner rim 98a of pulley 98 to transfer torque therebetween and a second drive belt 102 extends from the outer rim 98b of pulley 98 to a pulley 104 mounted on the input shaft 105 of generator 90 to transfer torque therebetween. Additionally, a first solenoid clutch 108 is operatively associated with drive pulley 96 for selectively engaging pulley 96 under certain operating conditions, and a second solenoid clutch 110 is operatively associated with double rim pulley 98 for engaging pulley 98 under other operating conditions to selectively control the connection of the engine 30 and generator 90.

Referring now to FIGS. 4–9, there is illustrated a series of schematic representations depicting the manner in which power is distributed throughout the drive system of the subject invention under various operating conditions. In the drawings, the directional arrows indicate the paths by which power is directed to and from the components of drive system 20, and in particular, to the two drive wheels 36 and 38 of the vehicle 10.

Figure 4:
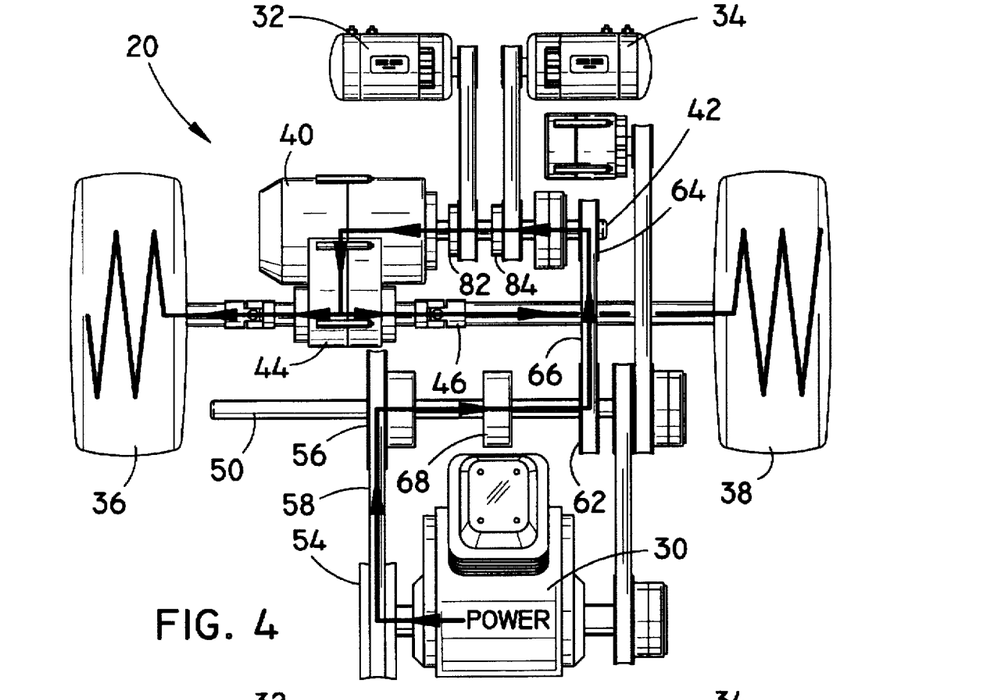
FIG. 4 is a schematic representation of the vehicle drive system of the subject invention illustrating the deliverance of power from the internal combustion engine to the primary drive shaft of the vehicle.

Turning to FIG. 4, as discussed hereinabove, under certain conditions, vehicle 10 may accelerate from a stationary position to a predetermined speed, utilizing only the power of internal combustion engine 30. Thus, as depicted by the directional arrows in FIG. 4, power from engine 30 is transferred from output shaft 35 to the secondary drive shaft 50 by way of the torque connector assembly 52, and then to the input shaft 42 of transmission assembly by pulley 62 and 64 and belt 66. At such a time, overrunning clutch 68 is engaged to secondary drive shaft 50, and the overrunning clutches 82 and 84 on input shaft 42 are disengaged, so that during acceleration, electric motors 32 and 34 present no parasitic drag to the system. However, as noted previously, when additional power is required to climb hills or rapidly accelerate (i.e. when merging onto a highway), the overrunning clutches 82 and 84 are engaged to enable the deliverance of power from motors 32 and 34 to the input shaft 42 of transmission assembly 40.

Figure 5:
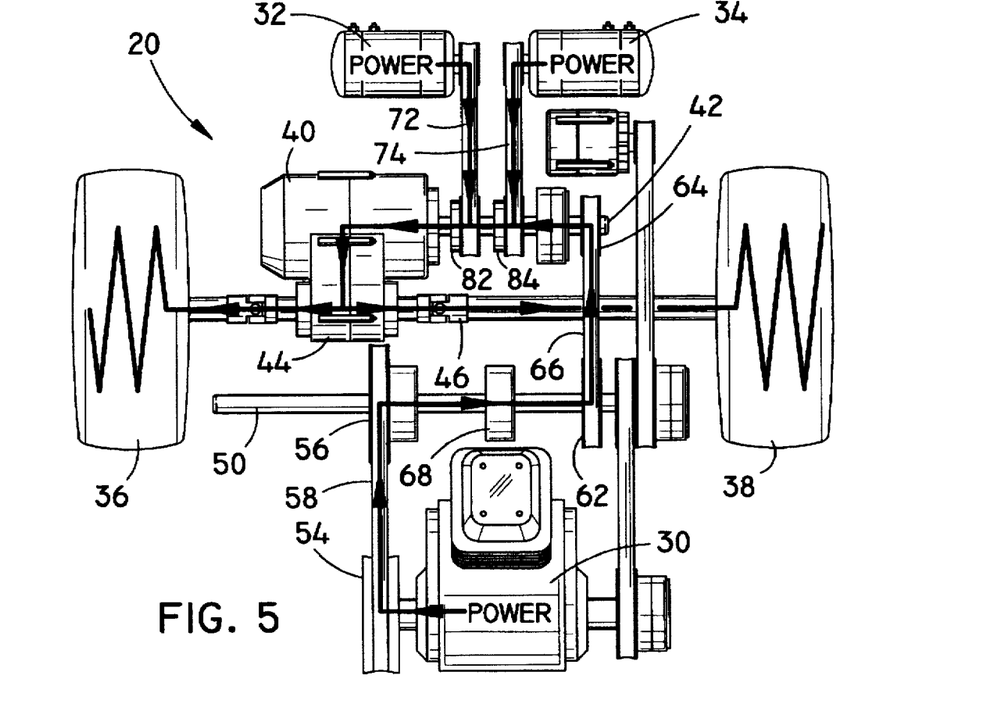
FIG. 5 is a schematic representation of the vehicle drive system of the subject invention illustrating the deliverance of power from the internal combustion engine of the electric motors to the primary drive shaft of the vehicle.
Figure 6:
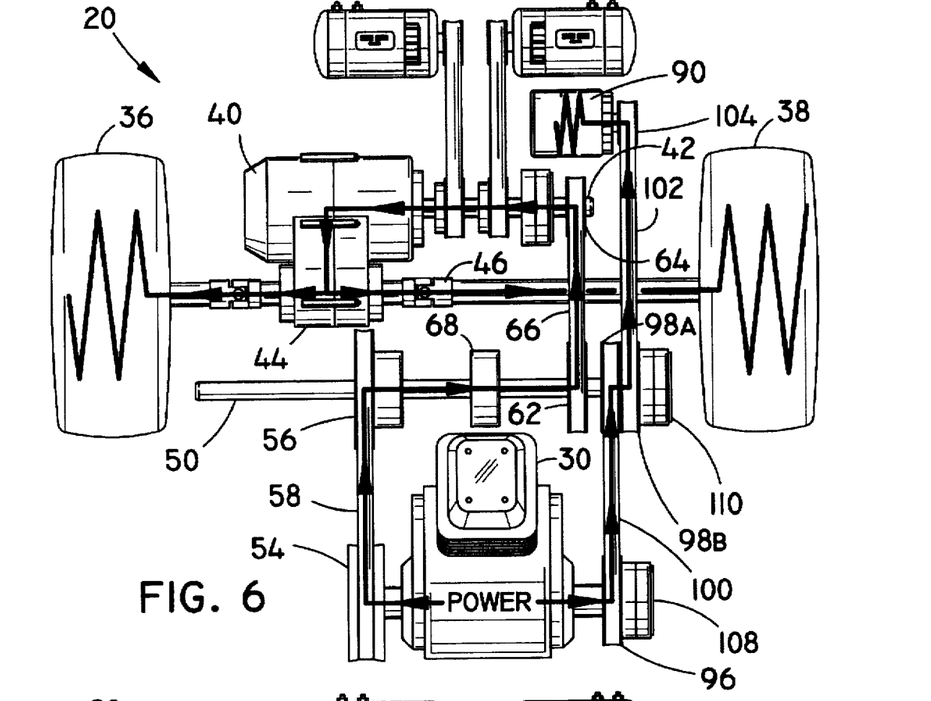
FIG. 6 is a schematic representation of the vehicle drive system of the subject invention illustrating the deliverance of power from the internal combustion engine to the primary drive shaft of the vehicle and the electric generator.
Figure 10:
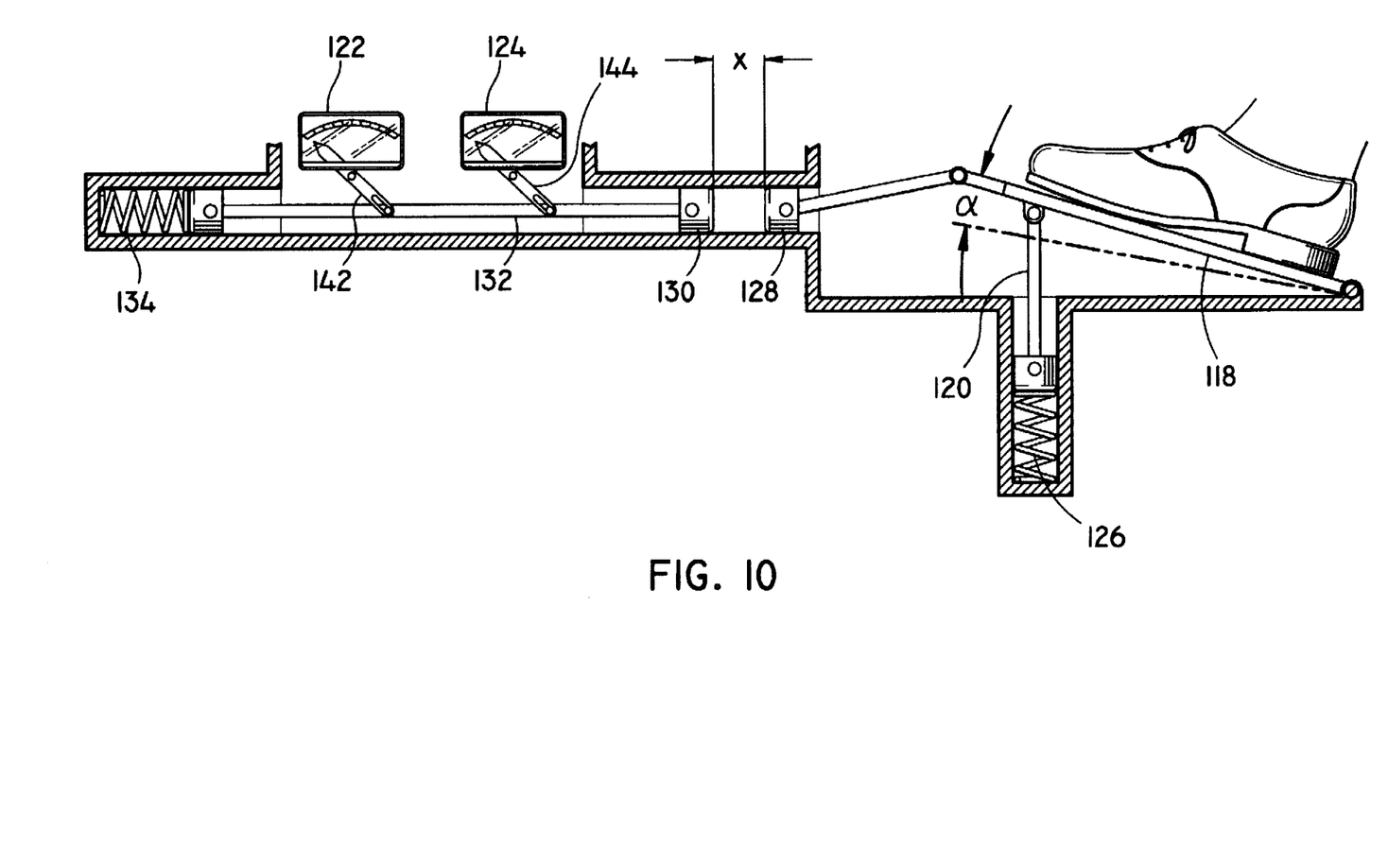
FIG. 10 is a schematic representation of a linkage assembly which connects the accelerator pedal of the vehicle to the combustion engine and the two electric motors of the drive system of the subject invention.

The engagement of overrunning clutches 82 and 84 is effectuated by movement of the accelerator pedal of vehicle 10. In particular, as illustrated in FIG. 10, the accelerator pedal 118 which controls the throttle 120 of engine 30 is also linked to two potentiometers 122 and 124 which are operatively connected to motors 32 and 34, respectively. In operation, when pedal 118 is depressed to normally accelerate vehicle 10 to cruising velocity it will do so by travelling through an angle "α" which is approximately equal to ⅓ the total distance which pedal 118 can travel against the bias of throttle spring 126. During that time, slider 128 which is linked to pedal 118 translates through a linear distance "x" corresponding to the angular distance "α". When pedal 118 is depressed further than the angle "α", to achieve rapid acceleration for example, slider 128 will interact with, and drive adjacent slider 130. In doing so, slider link 132 will translate against the bias of spring 134, causing the parallel potentiometer links 142 and 144 to rotate, and thereby actuate electric motors 32 and 34, respectively. At such a time as illustrated in FIG. 5, vehicle 10 will be operating under the combined power of engine 30 and motors 32 and 34, and will have the same power as an automobile having a conventional internal combustion engine. When the added power is no longer required, and pedal 118 returns to its first third sector of motion, clutches 82 and 84 disengage from the input shaft 42, and the vehicle operates once again under the sole power of engine 30. Thereupon, the mean horsepower of engine 30 is used to maintain the vehicle at the cruising velocity, and the remaining peak horsepower can be used for power generation.

Turning to FIG. 5, the drive system 20 of the subject invention is also configured to that engine 30 can charge generator 90 while vehicle 10 is operating under the sole power of the gas engine. During such operating condition, solenoid clutch 108 is engaged and power is transmitted from the output shaft 94 of engine 30 to the input shaft 105 of generator 90 by way of drive belts 100 and 102. Through the use of a voltage regulator and selection of pulley ratios, the generator will draw only a small amount of power from the engine, leaving sufficient power to propel the vehicle. Solenoid clutch 108 is preferably controlled by a battery charge indicator and an engine speed sensor. Thus, when the batteries 92 are approximately 60% discharged and the engine is operating at a sufficient speed, clutch 108 will engage, permitting engine 30 to drive generator 90. When the batteries are approximately 20% discharged, or the engine is running too slow, clutch 108 disengages, eliminating the parasitic drag of the generator on the system. During this period of operation, solenoid clutch 110 is disengaged so that the double rim pulley 98 rotates independent of the rotation of the secondary drive shaft 50 which is receiving power from engine 30.

Figure 7:
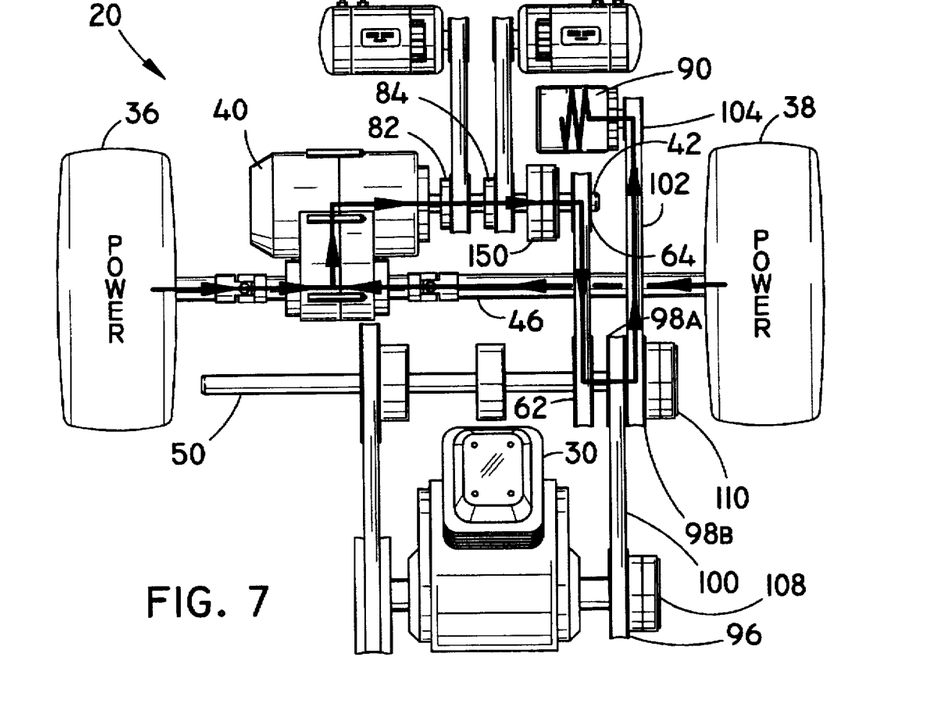
FIG. 7 is a schematic representation of the vehicle drive system of the subject invention illustrating the deliverance of power to the electric generator from the drive wheels of the vehicle.

Referring to FIG. 7, the drive system 20 of the subject invention also incorporates a regenerative braking subsystem wherein energy is transferred from the drive wheels of vehicle 10 to generator 90 as the transmission assembly is downshifted to slow the vehicle. In operation, when accelerator pedal 118 is released, solenoid clutch 108 disengages, allowing engine 30 to return to its idle speed. At such a time, overrunning clutch 68, which transmits torque in only one direction disengages, since the driven pulley 56 of torque converter 52 is turning slower then the drive pulley 62 on secondary drive shaft 50. Thereupon, vehicle 10 is free to coast to a full stop without any parasitic drag from engine 30. Thereafter, when the brake pedal is depressed, solenoid clutch 110 engages, causing power to be transmitted from the front wheels to generator 90. During this time, torque is transferred from the input shaft 42 of the downshifting transmission assembly to generator 90 by way of drive belts 66 and 102.

Figure 8:
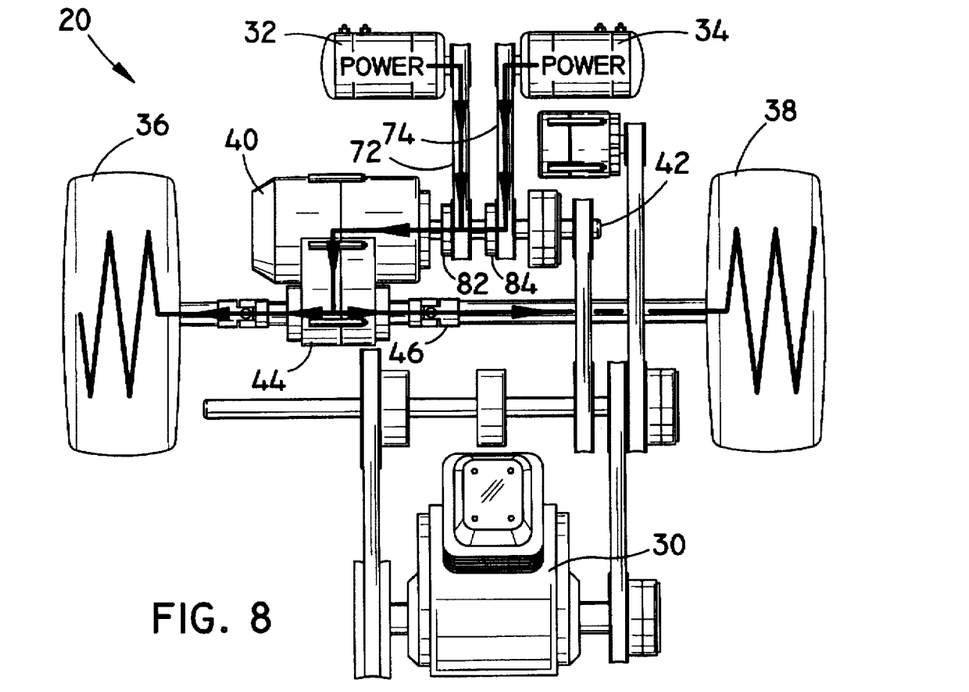
FIG. 8 is a schematic representation of the vehicle drive system of the subject invention illustrating the deliverance of power from the electric motors to the primary drive shaft of the vehicle.

Referring now to FIG. 8, the drive system of the subject invention is configured to operate in a zero emissions mode wherein power is transmitted to the drive wheels of vehicle 10 solely from electric motors 32 and 34. In this mode of operation, overrunning clutches 82 and 84 are engaged and power is transmitted from motor 32 and 34 to the input shaft 42 of transmission assembly 40 by way of belts 72 and 74, respectively. At such a time, a third solenoid clutch 150, which is mounted on the input shaft 42 of transmission assembly 40 is engaged and pulleys 62 and 64 are rotating so that power will be readily available to generator 90 if the brake pedal of the vehicle is applied. Additionally, overrunning clutch 68 is disengaged so that the engine 30 and torque converter 42 remain stationary. Solenoid clutches 108 and 110 are also disengaged at this time, so that all unnecessary parasitic drag is eliminated. Furthermore, since engine 30 is isolated from the rest of the system when the vehicle is operating in a zero emission mode, the first third of the travel of accelerator pedal 118 will produce no response. However, when the pedal is depressed further, the potentiometers which control the speed of motors 32 and 34 will be activated.

The zero emission mode of operation depicted in FIG. 8 can be selectively chosen by the driver by manipulating a selector switch 160 located on the dashboard of the vehicle (see FIG. 1). Thus, if the driver is taking a short trip, i.e., 25 miles or less, and is travelling within a city environment having strict pollution controls, the zero emission mode can be easily selected. This mode may be less advantageous for longer trips due to the storage capacity of the batteries.

Figure 9:
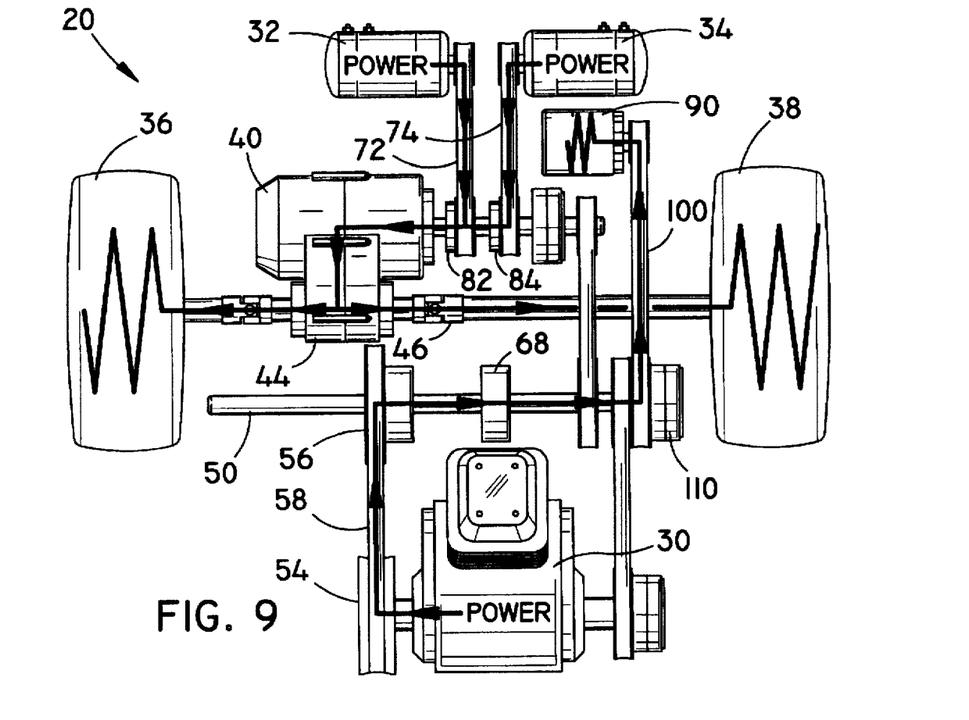
FIG. 9 is a schematic representation of the vehicle drive system of the subject invention illustrating the deliverance of power from the electric motors to the primary drive shaft of the vehicle and from the internal combustion engine to the electric generator.

Referring to FIG. 9, there is illustrated a schematic representation of the manner in which power is distributed within the drive system 20 of the subject invention when the system is switched from a parallel operating mode to a series operating mode. In a parallel mode of operation, mechanical energy from engine 30 is transmitted directly to the drive wheels together with energy from the electric motors. In a series mode of operation, which is more efficient in stop-and-go traffic than a parallel configuration, power is delivered to the drive wheels only by the electric motors, and the engine is employed to deliver power to the generator.

Figure 11:
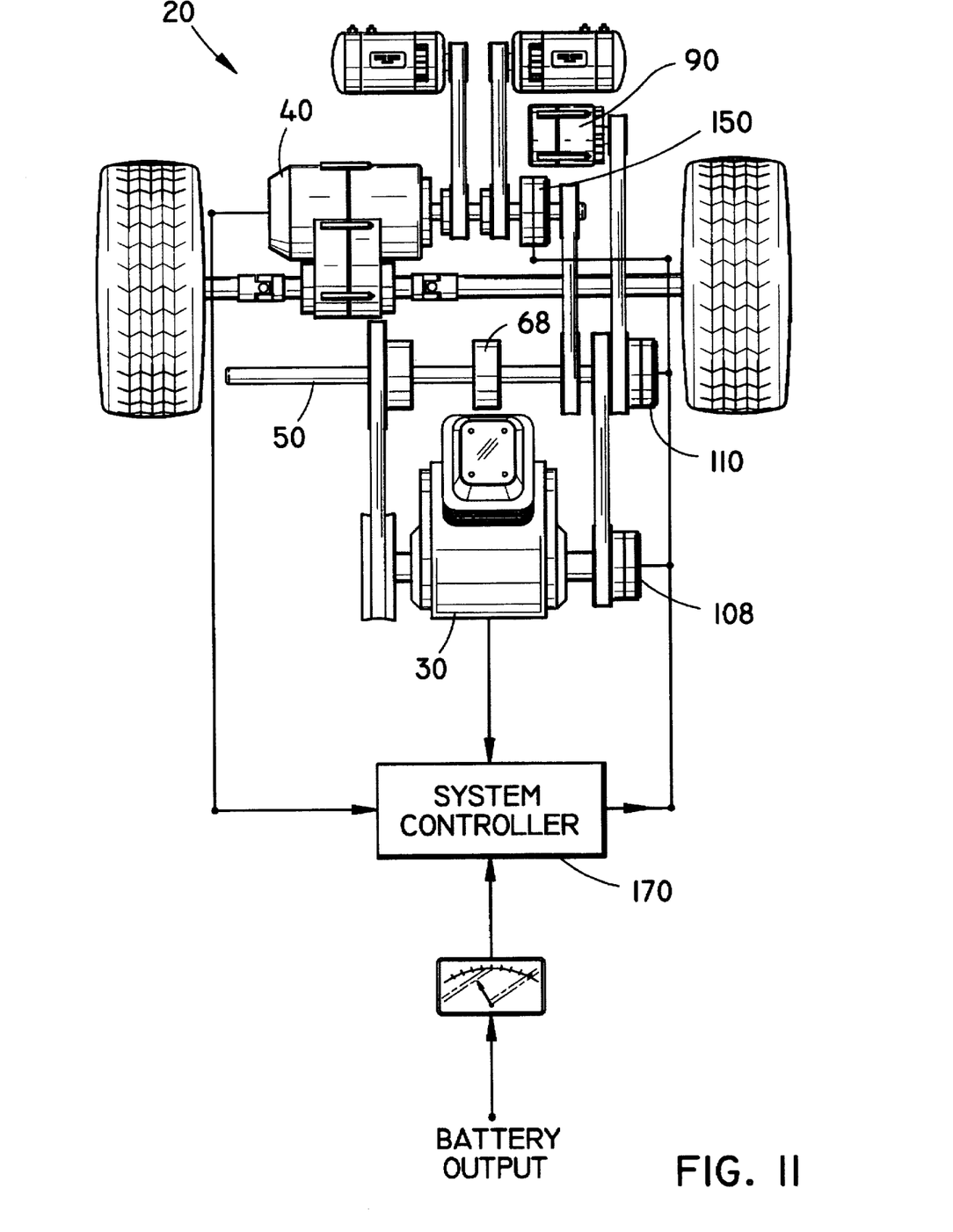
FIG. 11 is a schematic representation of a system controller which controls the various operating modes of the drive system of the subject invention.

As illustrated schematically in FIG. 11, the drive system of the subject invention utilizes a computerized controller 170 to switch between the series and parallel modes of operation. The system controller monitors all of the control parameters of the drive system including, for example, battery state of charge and vehicle speed, and is electrically connected to each of the interactive components of the drive system. Under conditions which are favorable to the series operating mode, the system controller disengages solenoid clutch 150 and engages solenoid clutch 110 so that all of the mechanical energy of engine 30 is transmitted to generator 90 by way of the secondary shaft 50. Since the torque converter is in operation at this time, power generation increases and decreases in proportion to engine speed. In this mode of operation, it is also possible to temporarily engage clutch 150 to send power to the generator from the drive wheels during the regenerative braking periods. At such times, overrunning clutch 68 allows engine 30 to slow to idle speed, thus conserving the energy consumed thereby.

The subject invention provides a hybrid electric vehicle with several unique components including: (1) a pulley-type torque converter used with an internal combustion engine and a multi-speed transmission; (2) an overrunning clutch allowing the vehicle to be driven on pure electric power without parasitic drag from the internal combustion engine or torque converter; and (3) a clutch allowing the hybrid drive system to switch back and forth between series and parallel configurations.

Although the subject invention has been described with respect to preferred embodiments, it will be readily apparent to those having ordinary skill in the art to which it appertains that changes and modifications may be made thereto without departing from the spirit or scope of the subject invention as defined by the appended claims. For example, the belts and pulleys can all be replaced by a gear box having input and output shafts for the engine, generator, and electric motors. Additionally, the electric and gas engine throttles can be operated by computer controlled actuators instead of the mechanical system described in FIG. 10. This would allow a computer to automatically adjust the duty cycles of the internal combustion engine and electric motors to reach any desired depth of battery discharge after a specified number of miles.

It is also envisioned that the energy distribution system of the subject invention can be employed to reduce home energy costs. More particularly, the vehicle can be used as a portable generator to power the home. In such instances, solar panels would be employed to maintain a charge in the batteries for mean power consumption, and the internal combustion engine can be utilized for peak power demands. The engine could be powered by natural gas rather than conventional fuels.

What is claimed is:

1. A method of distributing energy in a vehicle having a hybrid electric drive system including an internal combustion engine and at least one electric motor linked to an energy storage means, the internal combustion engine and the at least one electric motor delivering torque to a primary drive shaft having at least two drive wheels operatively associated therewith, the method including the steps of:
    a) delivering torque from at least one of the internal combustion engine and the electric motor to the primary drive shaft to accelerate the vehicle from a stationary position to a predetermined cruising velocity;
    b) disengaging the electric motor from the primary drive shaft once the vehicle has accelerated to the cruising velocity to reduce parasitic drag on the system;
    c) delivering torque from the internal combustion engine to the primary drive shaft utilizing a mean horsepower of the internal combustion engine to maintain the vehicle at the cruising velocity; and
    d) adjusting duty cycles of the internal combustion engine and the at least one electric motor to reach a desired depth of energy storage means discharge after a specified number of miles.

2. A method according to claim 1, further comprising the step of maintaining the electric motor in a neutral condition so that it is disengaged from the primary drive shaft to reduce parasitic drag on the system.

3. A method according to claim 2, further comprising the step of selectively engaging the electric motor to the primary drive shaft to assist the internal combustion engine in accelerating the vehicle to the cruising velocity.

4. A method according to claim 3, wherein the step of selectively engaging the electric motor to the primary drive shaft involves depressing an accelerator pedal of the vehicle a predetermined distance.

5. A method according to claim 1, further comprising the step of providing a generator to generate electrical energy for storage in the energy storage means and utilization by the electric motor in powering the vehicle.

6. A method according to claim 5, wherein the vehicle includes brakes and further comprising the step of transferring torque from the drive wheels to the generator when the brakes are applied.

7. A method according to claim 5, further comprising the step of transmitting power directly from the internal combustion engine to the generator while the electric motor is transmitting power directly to the primary drive shaft.

8. A method according to claim 7, further comprising the step of engaging the internal combustion engine to the generator when the electrical energy stored in the energy storage means falls below a predetermined minimum level.

9. A method according to claim 5, further comprising the step of transmitting power from the internal combustion engine to both the generator and the primary drive shaft while maintaining the electric motor in a neutral condition so that it is disengaged from the primary drive shaft.

10. A method of distributing energy in a vehicle having a hybrid electric drive system including an internal combustion engine and at least one electric motor linked to energy storage means, the internal combustion engine and the at least one electric motor delivering torque to a primary drive shaft by way of a transmission assembly, the primary drive shaft having at least two drive wheels operatively associated therewith, the method including the steps of:

a) delivering torque from the internal combustion engine and the electric motor to an input shaft of the transmission assembly to accelerate the vehicle from a stationary position to a predetermined cruising velocity;

b) disengaging the electric motor from the input shaft of the transmission assembly once the vehicle has accelerated to the cruising velocity to reduce parasitic drag on the system;

c) delivering torque from the internal combustion engine to the input shaft of the transmission assembly utilizing a mean horsepower of the internal combustion engine to maintain the vehicle at the cruising velocity; and d) adjusting the duty cycles of the internal combustion engine and the at least one electric motor to reach a desired depth of energy storage means discharge after a specified number of miles.

11. A method according to claim 10, further comprising the step of maintaining the electric motor in a neutral condition so that it is disengaged from the input shaft of the transmission assembly to reduce parasitic drag on the system.

12. A method according to claim 11, further comprising the step of selectively engaging the electric motor to the input shaft of the transmission assembly to assist the internal combustion engine in accelerating the vehicle to the cruising velocity.

13. A method according to claim 12, wherein the step of selectively engaging the electric motor to the primary drive shaft involves depressing an accelerator pedal of the vehicle a predetermined distance.

14. A method according to claim 10, further comprising the step of providing a generator to generate electrical energy for storage in an energy storage means and utilization by the electric motor in powering the vehicle.

15. A method according to claim 14, further comprising the step of transferring torque from the drive wheels to the generator when the transmission assembly is downshifted during braking.

16. A method according to claim 14, further comprising the step of transmitting power directly from the internal combustion engine to the generator while the electric motor is transmitting power directly to the input shaft of the transmission assembly.

17. A method according to claim 14, further comprising the step of engaging the internal combustion engine to the generator when the electrical energy stored in the energy storage means falls below a predetermined minimum level.

18. A method according to claim 14, further comprising the step of transmitting power from the internal combustion engine to the generator and the input shaft of the transmission assembly while maintaining the electric motor in a neutral condition so that it is disengaged from the input shaft of the transmission assembly.

* * * * *